(12) United States Patent
Zhang et al.

(10) Patent No.: US 8,310,325 B2
(45) Date of Patent: Nov. 13, 2012

(54) PERMANENT MAGNET DEVICE

(75) Inventors: Ming Zhang, Ballwin, MO (US); Sesha Madireddi, St. Charles, MO (US)

(73) Assignee: Hussmann Corporation, Bridgeton, MO (US)

(\*) Notice: Subject to any disclaimer, the term of this patent is extended or adjusted under 35 U.S.C. 154(b) by 0 days.

(21) Appl. No.: 13/361,417

(22) Filed: Jan. 30, 2012

(65) Prior Publication Data

US 2012/0126922 A1 May 24, 2012

Related U.S. Application Data

(63) Continuation of application No. 12/245,467, filed on Oct. 3, 2008, now Pat. No. 8,138,873.

(60) Provisional application No. 60/997,687, filed on Oct. 4, 2007.

(51) Int. Cl.
    *H01F 7/02* (2006.01)

(52) U.S. Cl. ........ 335/306; 335/219; 335/284; 335/296; 335/297; 335/302; 335/304

(58) Field of Classification Search ............. 335/219, 335/284–285, 296, 297, 302–306; 62/3.1
See application file for complete search history.

(56) References Cited

U.S. PATENT DOCUMENTS

| | | |
|---|---|---|
| 2,489,264 A | 11/1949 | Byrd, Jr. |
| 3,325,758 A | 6/1967 | Cook |
| 3,354,833 A | 11/1967 | Laing |
| 3,768,054 A | 10/1973 | Neugebauer |
| 3,781,592 A | 12/1973 | Harrold |
| 3,855,498 A | 12/1974 | MacMaster et al. |
| 4,033,734 A | 7/1977 | Steyert, Jr. et al. |
| 4,222,021 A | 9/1980 | Bunker, Jr. |
| 4,332,135 A | 6/1982 | Barclay et al. |
| 4,408,463 A | 10/1983 | Barclay |
| 4,507,927 A | 4/1985 | Barclay |
| 4,532,770 A | 8/1985 | Hakuraku et al. |
| 4,536,230 A | 8/1985 | Landa et al. |
| 4,549,155 A | 10/1985 | Halbach |
| 4,589,953 A | 5/1986 | Nakagome et al. |

(Continued)

FOREIGN PATENT DOCUMENTS

DE 804694 4/1951

(Continued)

OTHER PUBLICATIONS

Notice of Allowance from the United States Patent Office for U.S. Appl. No. 12/236,583 dated Mar. 2, 2012 (16 pages).

*Primary Examiner* — Mohamad Musleh
(74) *Attorney, Agent, or Firm* — Michael Best & Friedrich LLP

(57) ABSTRACT

A magnet arrangement for creating a magnetic field. The magnet arrangement includes a first magnet having a first surface defining a first pole and a second surface defining a second pole opposite the first pole, and a second magnet having a third surface defining a third pole and a fourth surface defining a fourth pole opposite the third pole. The second surface has a higher magnetic flux density than the first surface. The third surface has a higher magnetic flux density than the fourth surface. The second magnet is spaced from the first magnet to define a first gap between the second surface and the third surface. Magnetic field lines of the magnetic field run from the first surface to the second surface, from the second surface to the third surface through the first gap, and from the third surface to the fourth surface.

15 Claims, 15 Drawing Sheets

U.S. PATENT DOCUMENTS

| | | | |
|---|---|---|---|
| 4,614,930 A | 9/1986 | Hickey et al. |
| 4,625,519 A | 12/1986 | Hakuraku et al. |
| 4,642,994 A | 2/1987 | Barclay et al. |
| 4,702,090 A | 10/1987 | Barclay et al. |
| 4,717,876 A | 1/1988 | Masi et al. |
| 4,785,636 A | 11/1988 | Hakuraku et al. |
| 4,956,976 A | 9/1990 | Kral et al. |
| 4,999,600 A | 3/1991 | Aubert |
| 5,024,059 A | 6/1991 | Noble |
| 5,034,715 A | 7/1991 | Leupold et al. |
| 5,075,662 A | 12/1991 | Leupold et al. |
| 5,091,361 A | 2/1992 | Hed |
| 5,182,914 A | 2/1993 | Barclay et al. |
| 5,249,424 A | 10/1993 | DeGregoria et al. |
| 5,352,302 A | 10/1994 | Takagi et al. |
| 5,506,558 A | 4/1996 | Laube |
| 5,512,872 A | 4/1996 | Ohashi |
| 5,635,889 A | 6/1997 | Stelter |
| 5,886,609 A | 3/1999 | Stelter |
| 5,934,078 A | 8/1999 | Lawton, Jr. et al. |
| 6,467,274 B2 | 10/2002 | Barclay et al. |
| 6,526,759 B2 | 3/2003 | Zimm et al. |
| 6,653,920 B1 | 11/2003 | Chen |
| 6,668,560 B2 | 12/2003 | Zimm et al. |
| 6,680,663 B1 | 1/2004 | Lee et al. |
| 6,935,121 B2 | 8/2005 | Fang et al. |
| 6,946,941 B2 | 9/2005 | Chell |
| 7,148,777 B2 | 12/2006 | Chell et al. |
| 7,365,623 B2 | 4/2008 | Xia |
| 2002/0040583 A1 | 4/2002 | Barclay et al. |
| 2002/0053209 A1 | 5/2002 | Zimm et al. |
| 2003/0106323 A1 | 6/2003 | Zimm et al. |
| 2004/0130221 A1 | 7/2004 | Ichii et al. |
| 2004/0140875 A1 | 7/2004 | Strom |
| 2005/0046533 A1 | 3/2005 | Chell |
| 2005/0120720 A1 | 6/2005 | Fang et al. |
| 2005/0242912 A1 | 11/2005 | Chell et al. |
| 2006/0091733 A1 | 5/2006 | Binnard et al. |
| 2007/0125094 A1 | 6/2007 | Iwasaki et al. |
| 2007/0130960 A1 | 6/2007 | Muller et al. |
| 2007/0240428 A1 | 10/2007 | Koga et al. |
| 2008/0078184 A1 | 4/2008 | Saito et al. |
| 2010/0071383 A1 | 3/2010 | Zhang et al. |

FOREIGN PATENT DOCUMENTS

| | | |
|---|---|---|
| DE | 1094358 | 12/1960 |
| FR | 2861454 A1 | 10/2003 |
| FR | 2861455 A1 | 10/2003 |
| FR | 2864211 A1 | 12/2003 |
| JP | 56026416 | 3/1981 |
| JP | 2004342796 | 12/2004 |
| WO | 2005043052 A1 | 5/2005 |
| WO | 2005074608 A2 | 8/2005 |

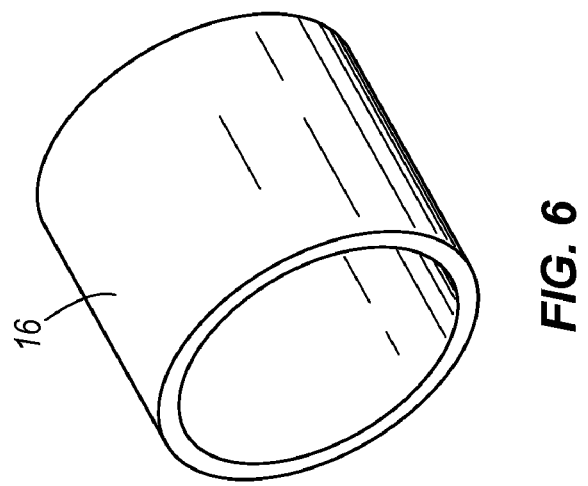
*FIG. 6*
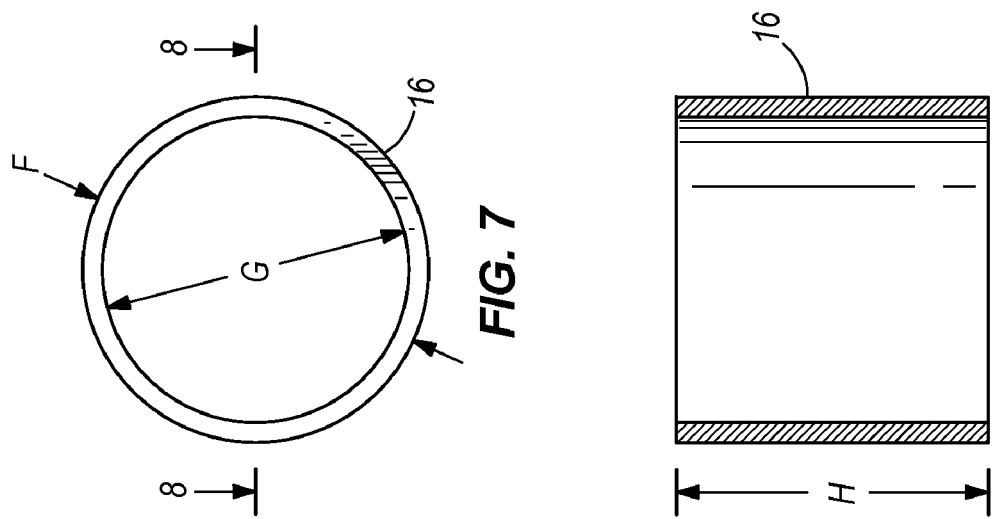
*FIG. 7*
*FIG. 8*

PERMANENT MAGNET DEVICE

RELATED APPLICATION DATA

This patent application is a continuation of U.S. patent application Ser. No. 12/245,467, filed Oct. 3, 2008, which claims priority to U.S. Provisional Application No. 60/997,687 filed Oct. 4, 2007, the entire contents of which are both incorporated herein by reference.

BACKGROUND

The present invention relates to a magnet assembly, and more particularly to a permanent magnet assembly for creating a periodic change in magnetic field. The permanent magnet assembly could be used, for example, in a magnetic refrigeration device.

Magnetic refrigeration devices generally include magnets and magnetocaloric material. The magnets are typically moved in an alternating fashion relative to the magnetocaloric material such that the magnetocaloric material experiences an increasing magnetic field when the magnets move closer, heating up the magnetocaloric material, and a decreasing magnetic field when the magnets move farther away, cooling the magnetocaloric material. Typically, a heat transfer fluid is passed through the magnetocaloric material to absorb the heat from the magnetocaloric material when the magnetic field increases, and the heat transfer fluid is then directed to a heat exchanger that releases the heat to the atmosphere. Then, the heat transfer fluid is passed through the magnetocaloric material to give up heat to the magnetocaloric material when the magnetic field decreases and the heat transfer fluid is directed to another heat exchanger to remove heat from air being circulated into a cooled space.

SUMMARY

In one aspect, the invention provides a magnet arrangement for creating a magnetic field. The magnet arrangement includes a first magnet having a first surface defining a first pole and a second surface defining a second pole opposite the first pole, and a second magnet having a third surface defining a third pole and a fourth surface defining a fourth pole opposite the third pole. The second surface has a higher magnetic flux density than the first surface. The third surface has a higher magnetic flux density than the fourth surface. The second magnet is spaced from the first magnet to define a first gap between the second surface and the third surface. Magnetic field lines of the magnetic field run from the first surface to the second surface, from the second surface to the third surface through the first gap, and from the third surface to the fourth surface.

In another aspect, the invention provides a magnet arrangement. The magnet arrangement includes a first magnet and a second magnet spaced from the first magnet to define a first gap between the first magnet and the second magnet. The first magnet and the second magnet create a magnetic field including magnetic field lines that converge in the first magnet, run through the gap between the first and second magnets, and diverge in the second magnet.

In another aspect, the invention provides a magnet. The magnet includes a first surface defining a first pole, and a second surface defining a second pole, the second surface spaced from the first surface. A magnetic flux increases in density from the first surface to the second surface, and wherein the magnet includes a substantially arcuate shape in a first cross section taken along a first plane and includes a substantially trapezoidal shape in a second cross section taken along a second plane substantially perpendicular to the first plane.

Other aspects of the invention will become apparent by consideration of the detailed description and accompanying drawings.

BRIEF DESCRIPTION OF THE DRAWINGS

FIG. 6 is a perspective view of the outer yoke of FIG. 1.

FIG. 7 is a top view of the outer yoke of FIG. 6.

FIG. 8 is a cross-sectional view taken along line 8-8 in FIG. 7.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
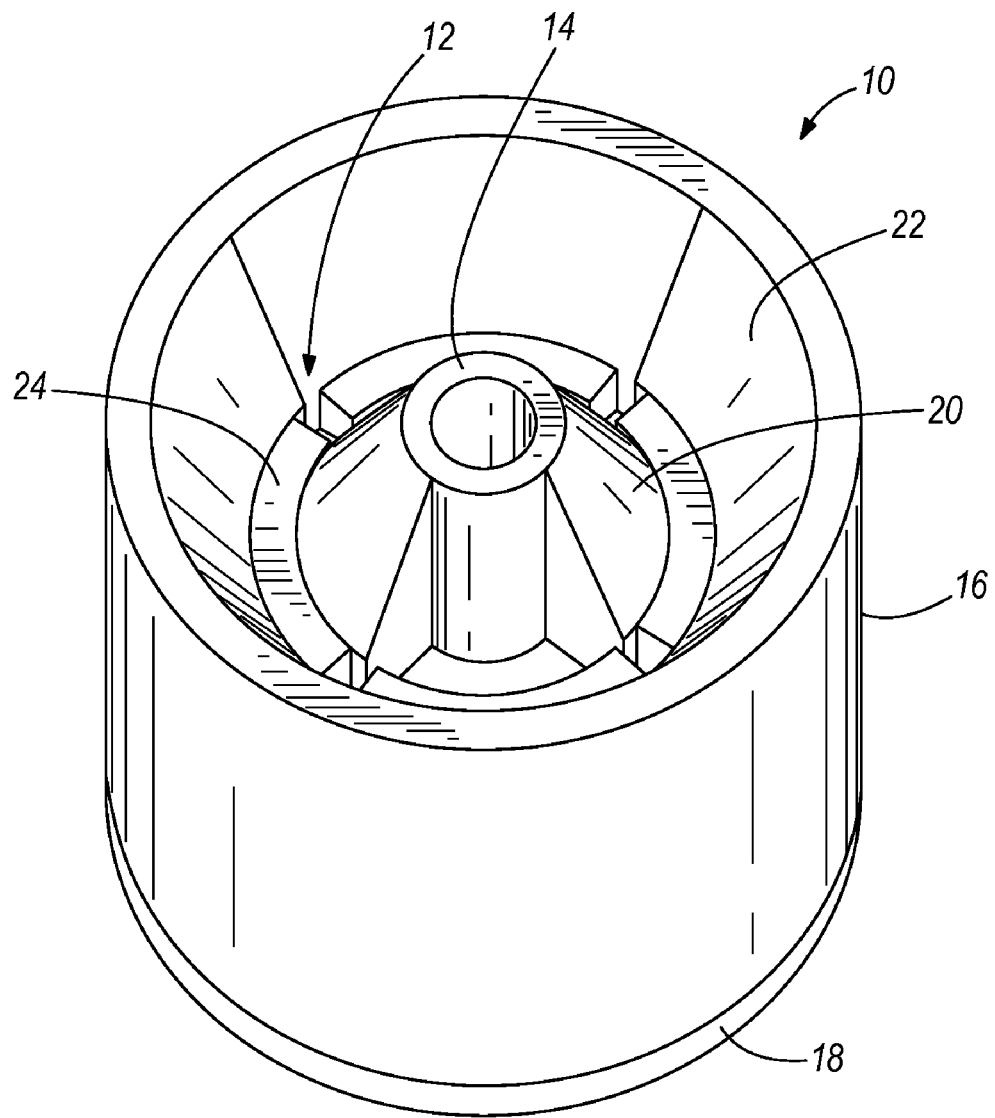
FIG. 1 is a perspective view of a magnetic refrigeration device according to one embodiment of the invention.
Figure 2:
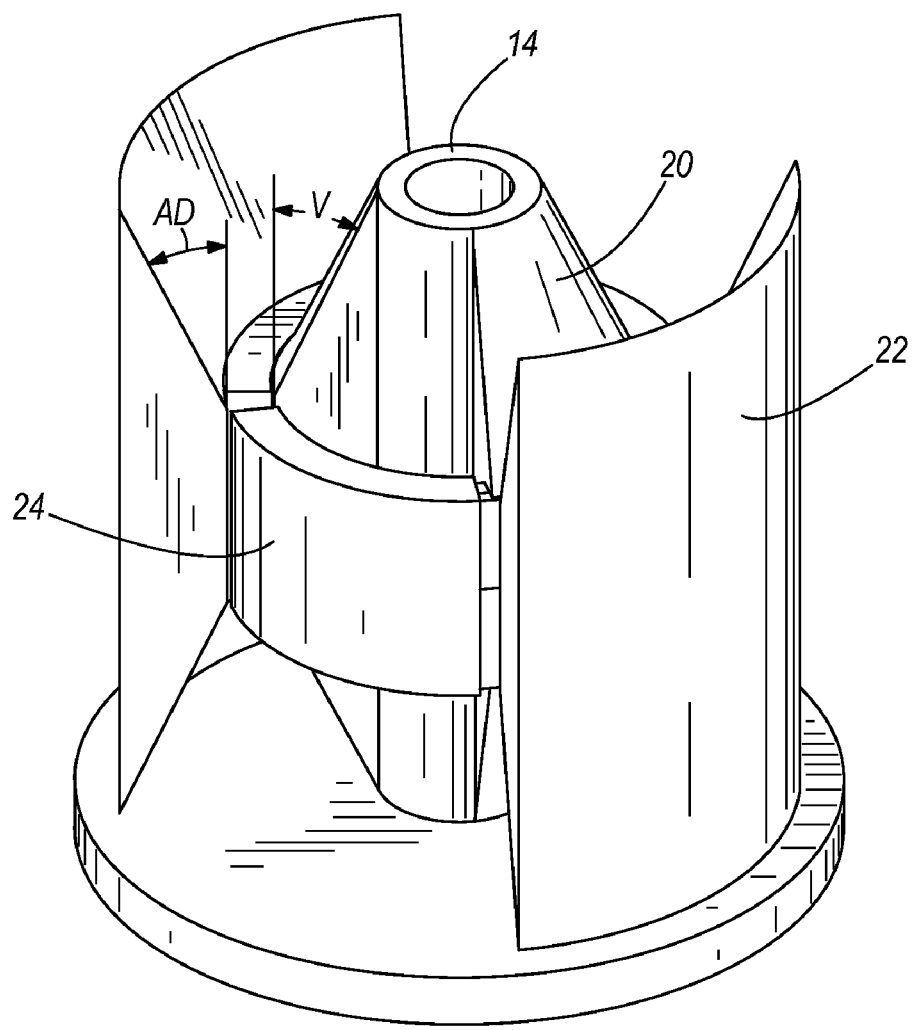
FIG. 2 is a perspective view of the magnetic refrigeration device shown in FIG. 1 with an outer yoke of the magnetic refrigeration device removed.

FIGS. 1 and 2 illustrate a magnetic refrigeration device 10 according to one embodiment of the present invention. The magnetic refrigeration device 10 includes a magnet assembly 12 having an inner yoke 14, an outer yoke 16 concentrically arranged outside of the inner yoke 14, an end plate 18 coupling the inner and outer yokes 14, 16, two inner permanent magnets 20 coupled to the inner yoke 14, and two outer permanent magnets 22 coupled to the outer yoke 16. Two end plates 18 may be used, but none is required. The magnetic refrigeration device 10 also includes a magnetocaloric element assembly including four magnetocaloric elements 24 disposed within a gap between the inner and outer permanent magnets 20, 22.

Figure 3:
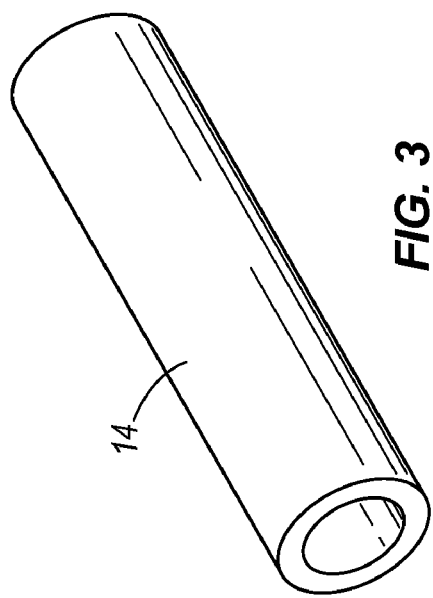
FIG. 3 is a perspective view of an inner yoke of the magnetic refrigeration device of FIG. 1.
Figure 4:
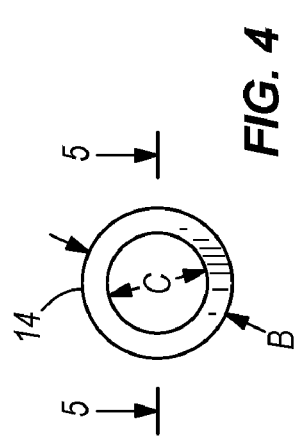
FIG. 4 is a top view of the inner yoke of FIG. 3.
Figure 5:
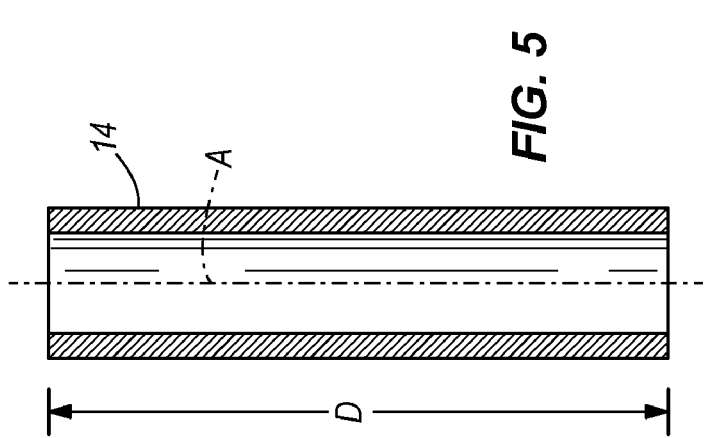
FIG. 5 is a cross-sectional view taken along line 5-5 in FIG. 4.

Best shown in FIGS. 3-5, the inner yoke 14 is a cylindrical tube having an outer diameter B that is concentric with an inner diameter C, and a height D. The inner yoke 14 defines an axis A. In one construction, the outer diameter B is approximately 60 mm, the inner diameter C is approximately 40 mm, and the height D is approximately 270 mm.

Best shown in FIGS. 6-8, the outer yoke 16 is a cylindrical tube having an outer diameter F that is concentric with an inner diameter G (about axis A), and a height H. In the illustrated construction, the outer diameter F is approximately 280 mm, the inner diameter G is approximately 250 mm, and the height H is approximately 250 mm.

Figure 9:
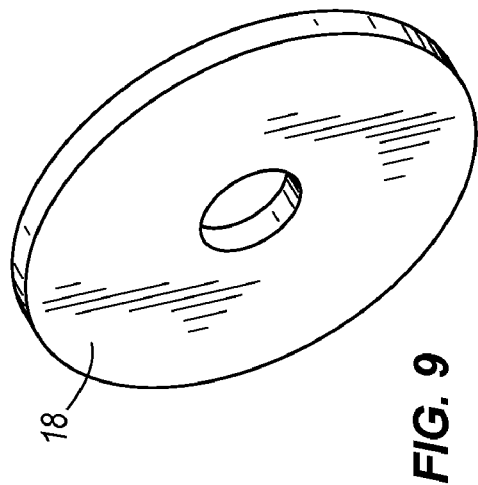
FIG. 9 is a perspective view of an end plate of the magnetic refrigeration device of FIG. 1.
Figure 10:
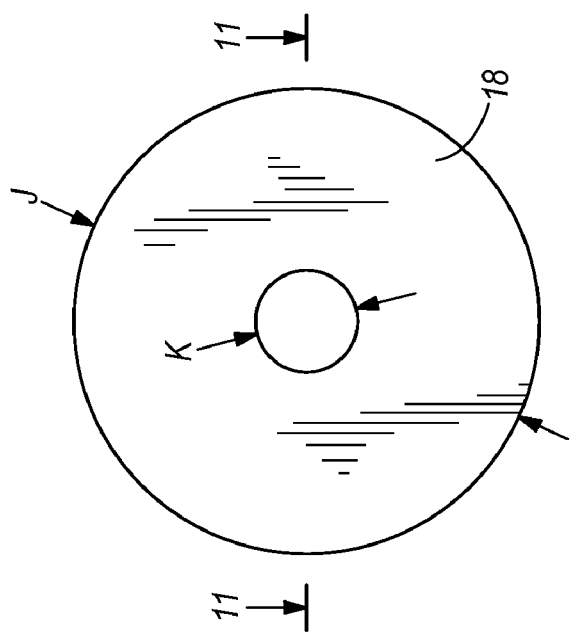
FIG. 10 is a top view of the end plate of FIG. 9.
Figure 11:
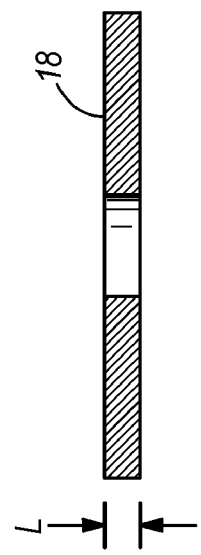
FIG. 11 is a cross-sectional view taken along line 11-11 in FIG. 10.
Figure 12:
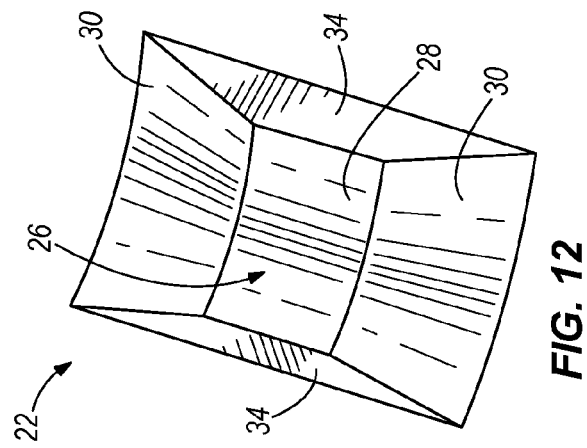
FIG. 12 is a perspective view of an outer permanent magnet of the magnetic refrigeration device of FIG. 1.
Figure 15:
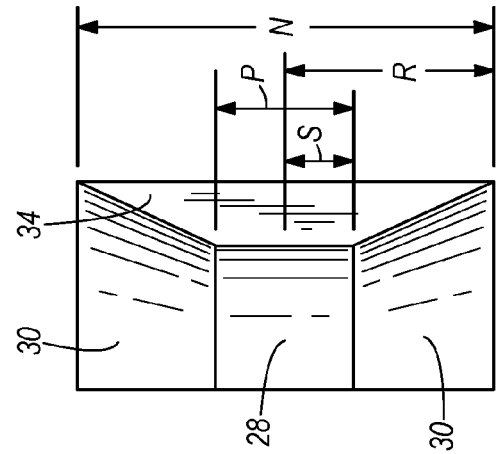
FIG. 15 is a side view of the outer permanent magnet of FIG. 12.
Figure 13:
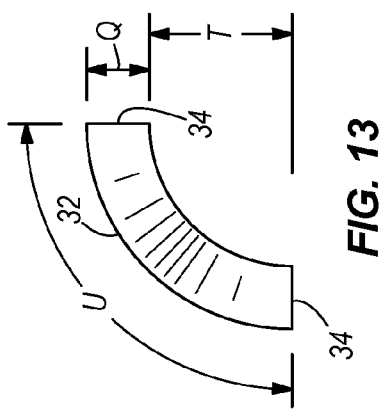
FIG. 13 is a top view of the outer permanent magnet of FIG. 12.
Figure 14:
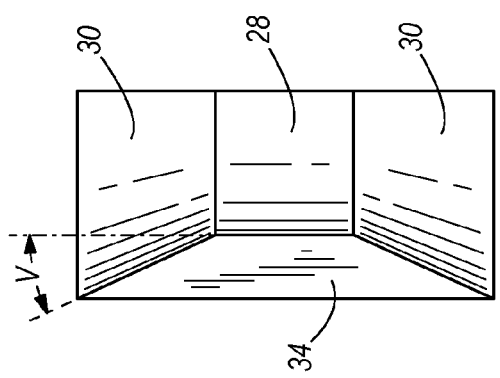
FIG. 14 is a front view of the outer permanent magnet of FIG. 12.
Figure 16:
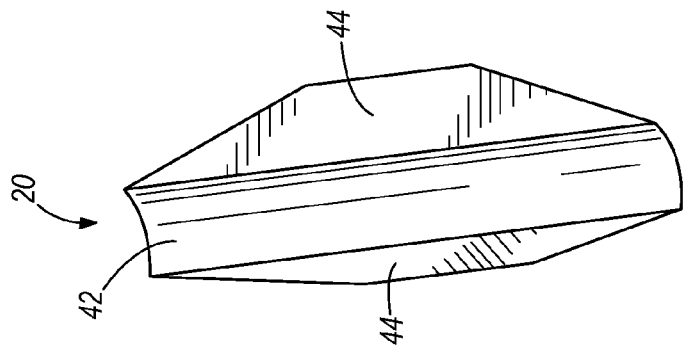
FIG. 16 is a perspective view of an inner permanent magnet of the magnetic refrigeration device of FIG. 1.
Figure 18:
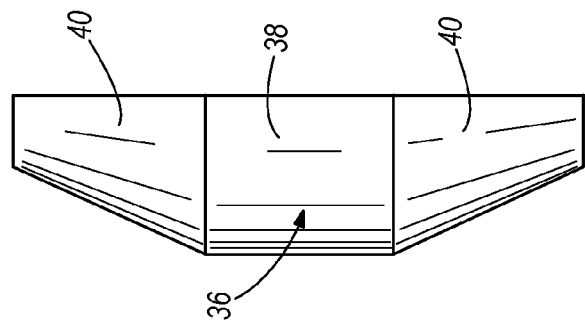
FIG. 18 is a side view of the inner permanent magnet of FIG. 16.
Figure 17:
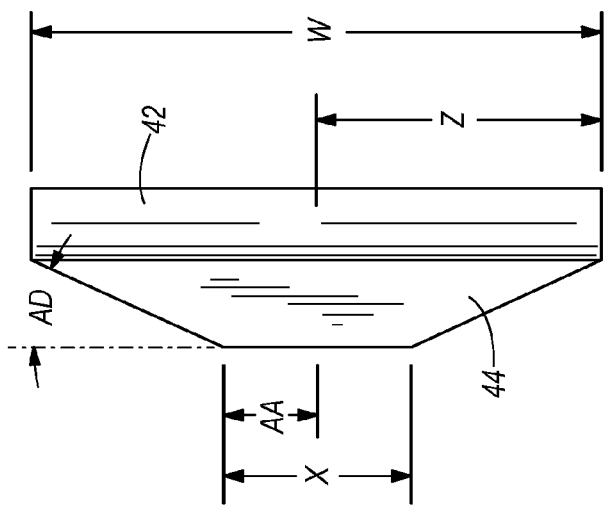
FIG. 17 is a front view of the inner permanent magnet of FIG. 16.
Figure 19:
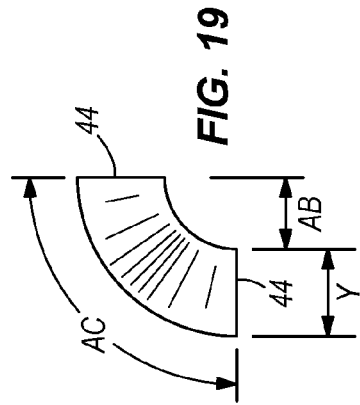
FIG. 19 is a top view of the inner permanent magnet of FIG. 16.

Best shown in FIGS. 9-11, the end plate 18 is a plate-like disk having an outer diameter J that is concentric with an inner diameter K (about axis A), and a thickness L. In the illustrated construction, the outer diameter J is approximately 280 mm, the inner diameter K is approximately 60 mm, and the thickness L is approximately 20 mm.

Best shown in FIGS. 12-15, the outer permanent magnet 22 includes an inner surface 26, an outer surface 32, and side surfaces 34. The inner surface 26 has a central surface 28 and two tapered surfaces 30 at opposite ends of the central surface 28. The height N of the outer permanent magnet 22, the height P of the central surface 28, heights R and S, angle V, and a width Q of the side surface 34 all generally define a trapezoid. In the illustrated embodiment, the trapezoid is an isosceles trapezoid. In other embodiments, the outer permanent magnet 22 can take other shapes generally converging from the outer surface 32 to the inner surface 26 (as viewed from a radial cross-section taken along a plane that is parallel to axis A). The inner surface 26 lies at a radial distance T from the center axis A of the arc U. In the illustrated construction, the height N is approximately 250 mm, the height P is approximately 81.56 mm, the height R is approximately 125 mm, the height S is approximately 40.78 mm, angle V is approximately 24.6 degrees, and width Q is approximately 38.5 mm. The trapezoid formed by these dimensions is the same for any radial cross-section of the outer permanent magnet 22 taken along a plane that is parallel to the axis A. The inner surface 26 lies at a distance T of approximately 87.33 mm from the axis A, which spans an angle of approximately 90 degrees.

Figure 29:
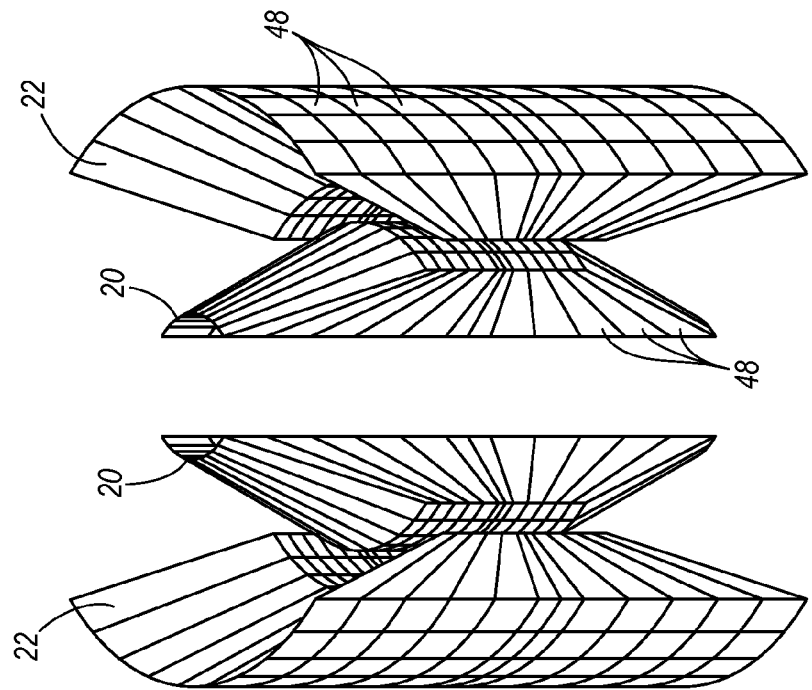
FIG. 29 is a perspective view of the individual magnets that make up the inner and outer permanent magnets.
Figure 28:
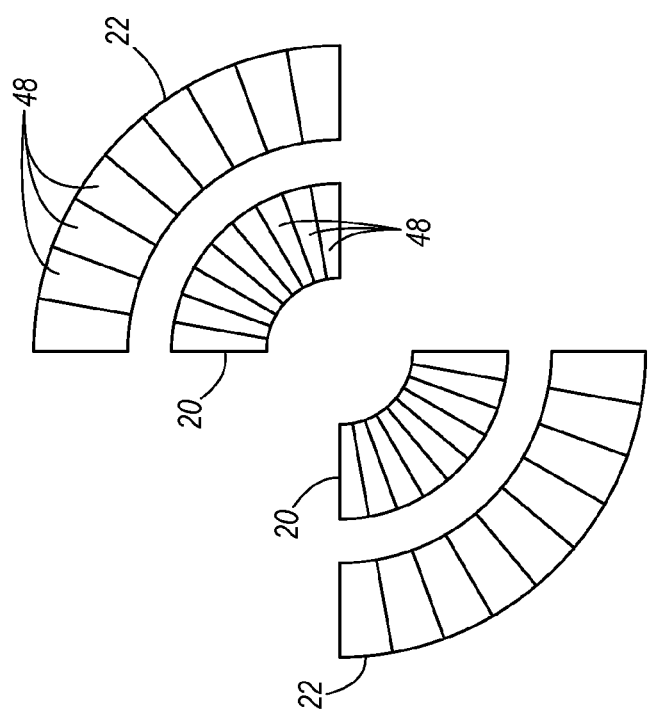
FIG. 28 is a top view of the individual magnets that make up the inner and outer permanent magnets.
Figure 30:
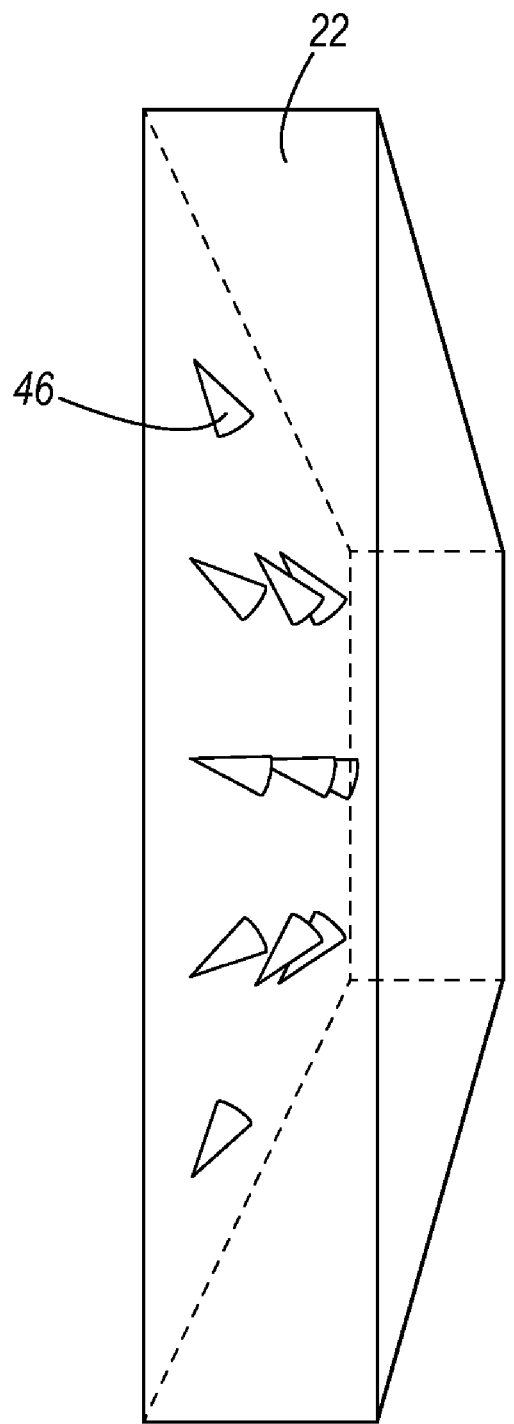
FIG. 30 is a perspective view of an outer permanent magnet (shown in FIG. 20) showing the direction of magnetic field vectors through it.

As best shown in FIGS. 28 and 29, the outer permanent magnet may be composed of a plurality of individual magnets 48 bonded together with epoxy, glue or another bonding means such that the north poles of each of the individual magnets are adjacent. While one hundred and eight individual magnets 48 are utilized to compose one whole magnet in the illustrated construction, fewer or more could be used in an alternate construction to create the same effect. In another construction, sixty individual magnets 48 may be utilized to compose one whole magnet. In one construction, each individual magnet 48 effectively includes a portion of the outer surface 32 and the inner surface 26 of the outer permanent magnet; however, it is not necessary for each and every individual magnet 48 to include these surfaces. In another construction, the outer permanent magnet may be constructed as a single piece having non-parallel magnetic field lines that converge or diverge from one pole to the other. A magnet having non-parallel magnetic field lines that converge or diverge is called a congruent magnet and can be constructed in any way that accomplishes this effect—including, but not limited to, the ways described above.

Figure 21:
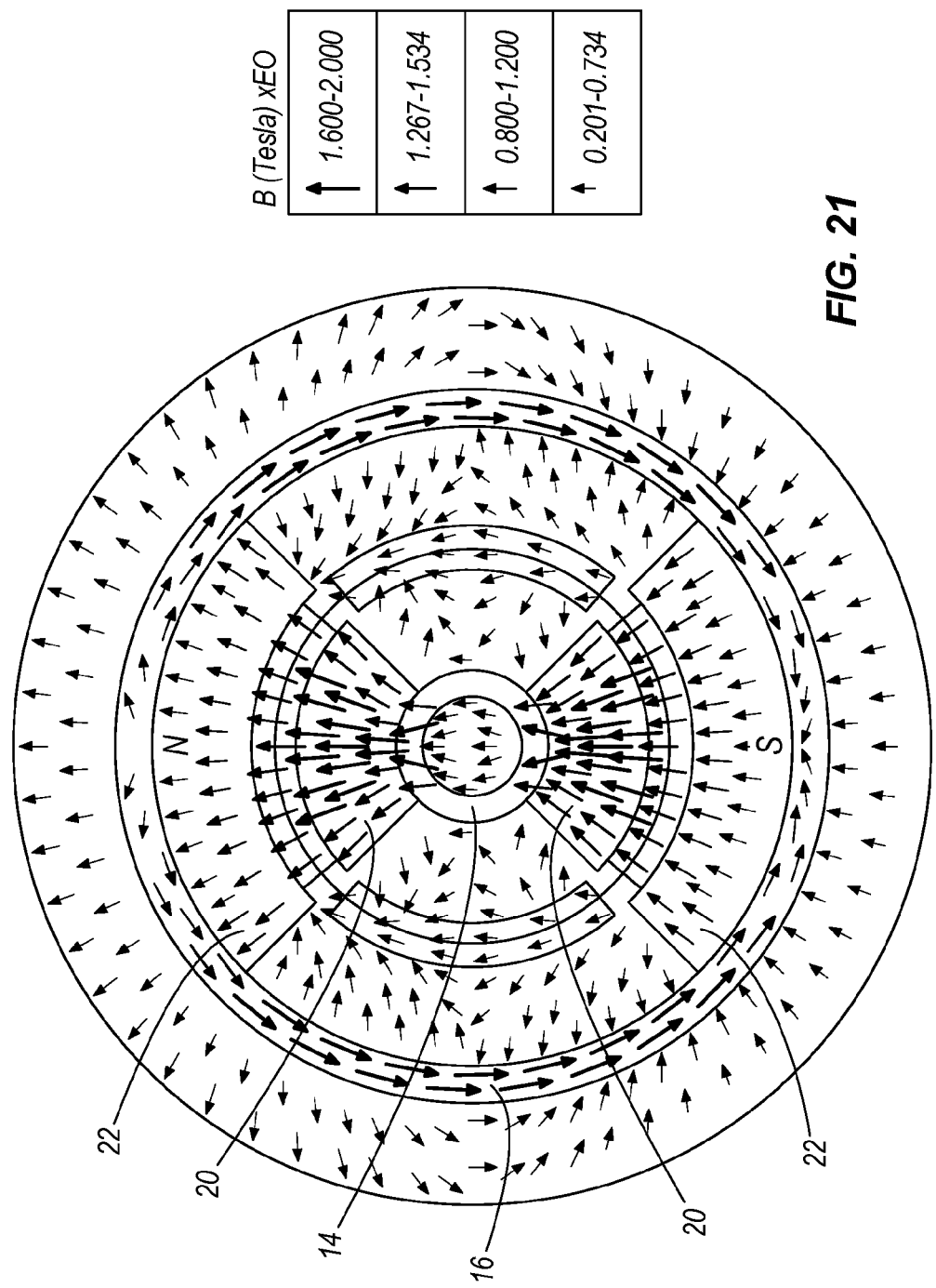
FIG. 21 is a cross-sectional top view of the magnetic refrigeration device shown in FIG. 1, taken through the middle, including arrows indicating the magnetic field vectors.

Best shown in FIGS. 16-19, the inner permanent magnet 20 includes an inner surface 42, an outer surface 36, and side surfaces 44. The outer surface 36 has a central surface 38 and two tapered surfaces 40 at opposite ends of the central surface 38. The height W of the outer permanent magnet 20, the height X of the central surface 38, heights Z and AA, angle AD, and a width Y of the side surface 44 all generally define a trapezoid. In the illustrated embodiment, the trapezoid is an isosceles trapezoid. In other embodiments, the inner permanent magnet 20 can take other shapes generally diverging from the outer surface 38 to the inner surface 42, as viewed from a radial cross-section taken along a plane that is parallel to the axis A (FIG. 22), and converging from the outer surface 38 to the inner surface 42 as viewed from a cross section taken along a plane that is normal to the axis A (FIG. 21). The inner surface 42 lies at a radial distance AB from the center of the arc AC. In the illustrated construction, the height W is approximately 250 mm, the height X is approximately 81.56 mm, the height Z is approximately 125 mm, the height AA is approximately 40.78 mm, angle AC is approximately 24.6 degrees, and width Y is approximately 38.5 mm. The trapezoid formed by these dimensions is the same for any radial cross-section of the inner permanent magnet 20 taken along a plane that is parallel to the axis A. The inner surface 42 lies at a distance AB of approximately 30 mm from the center axis A. The inner surface 42 spans an angle of approximately 90 degrees.

As best shown in FIGS. 28 and 29, the inner permanent magnet is composed of a plurality of individual magnets 48 bonded together with epoxy, glue or another bonding means such that the north poles of each of the individual magnets are adjacent and as such is called a congruent magnet. While one hundred and eight individual magnets 48 are utilized to compose one whole magnet in the illustrated construction, fewer or more could be used in an alternate construction to create the same effect. In another construction, sixty individual magnets 48 may be utilized to compose one whole magnet. In one construction, each individual magnet 48 effectively includes a portion of the outer surface 36 and the inner surface 42 of the inner permanent magnet; however, it is not necessary for each and every individual magnet 48 to include these surfaces. In another construction, the inner permanent magnet may be constructed as a single piece having non-parallel magnetic field lines that converge or diverge from one pole to the other. A magnet having non-parallel magnetic field lines that converge or diverge is called a congruent magnet and can be constructed in any way that accomplishes this effect—including, but not limited to, the ways described above.

With reference back to FIGS. 1 and 2, the inner 14 and outer 16 yokes are made of a magnetically permeable (magnetically soft) material such as 1010 steel or equivalent and are concentrically coupled to the end plate 18 about the axis A. The end plate is also made of a magnetically permeable (magnetically soft) material such as 1010 steel or equivalent. The outer diameter B of the inner yoke 14 is approximately equal to and fits inside the inner diameter K of the end plate 18 so that the end of one is flush with the end of the other. The height D of the inner yoke 14 is approximately equal to the height H of the outer yoke 16 plus the thickness L of the end plate 18.

The two inner permanent magnets 20 and the two outer permanent magnets 22 are high remnant flux density Br magnets such as NdFeB (Neodymium Iron Boron) N52 or any other equivalent high remnant flux density Br magnets. The inner surfaces 42 of the inner permanent magnets 20 are coupled to the outer diameter B of the inner yoke 14 and are spaced equidistantly from each other about the axis A. The outer surfaces 32 of the two outer permanent magnets 22 are coupled to the inner diameter G of the outer yoke 16 and are spaced equidistantly from each other about the axis A. Additionally, each inner permanent magnet 20 is paired with an outer permanent magnet 22 such that each pair of inner 20 and outer 22 permanent magnets share the same central axis A and occupy the same angular space with respect to that central axis A.

Shown in FIGS. 1 and 2 are the four magnetocaloric elements 24 disposed concentrically between the inner 20 and outer 22 permanent magnets and spaced equidistantly apart from each other about the axis A. The height of the magnetocaloric elements 24 is approximately equal to the height X of the central surface 38 of the inner permanent magnets 20 and the height P of the central surface 28 of the outer permanent magnets 22. The magnetocaloric elements 24 have a thickness of approximately 18 mm. Each magnetocaloric element 24 is shaped as an arc that is concentric with the arcs of the permanent magnets 20, 22 and defines an angle that is slightly less than the angles U, AC of the permanent magnets 20, 22. An air gap, also about 18 mm deep in the illustrated construction, is located in between each magnetocaloric element 24. Each magnetocaloric element 24 could be encapsulated by a thin shell made of plastic or another material (not shown) having substantially the same shape as the magnetocaloric elements 24 shown in the figures, wherein the magnetocaloric element 24 is disposed inside the thin shell in the form of a powder or beads.

Although not illustrated, it is understood by those of ordinary skill in the art that each magnetocaloric element 24 could include at least one inlet, at least one outlet, at least one pump and at least one valve and a system of pipes (not shown) configured to allow a fluid to flow through and provide heat transfer between the magnetocaloric elements 24 and hot and cold heat exchangers. The hot heat exchanger can be used to release heat into the atmosphere and the cold heat exchanger can be used to cool a space, such as a refrigerator. The present magnet assembly 12 design is advantageous because it provides ample space in which such features can be disposed.

The inner yoke 14 is coupled to a rotating device, such as a motor (not shown), so that the entire magnet assembly 12 rotates together as one piece around the magnetocaloric elements 24 at a speed between approximately 0.1 and 10 rotations/second. As the motor rotates, the inner yoke 14 and the outer yoke 16 share a common angular velocity. During rotation about the axis A, there is no relative movement between the inner and outer permanent magnets 20, 22. Alternatively, the magnetocaloric elements 24 could be configured to rotate and the magnet assembly 12 could be configured to remain stationary.

Figure 20:
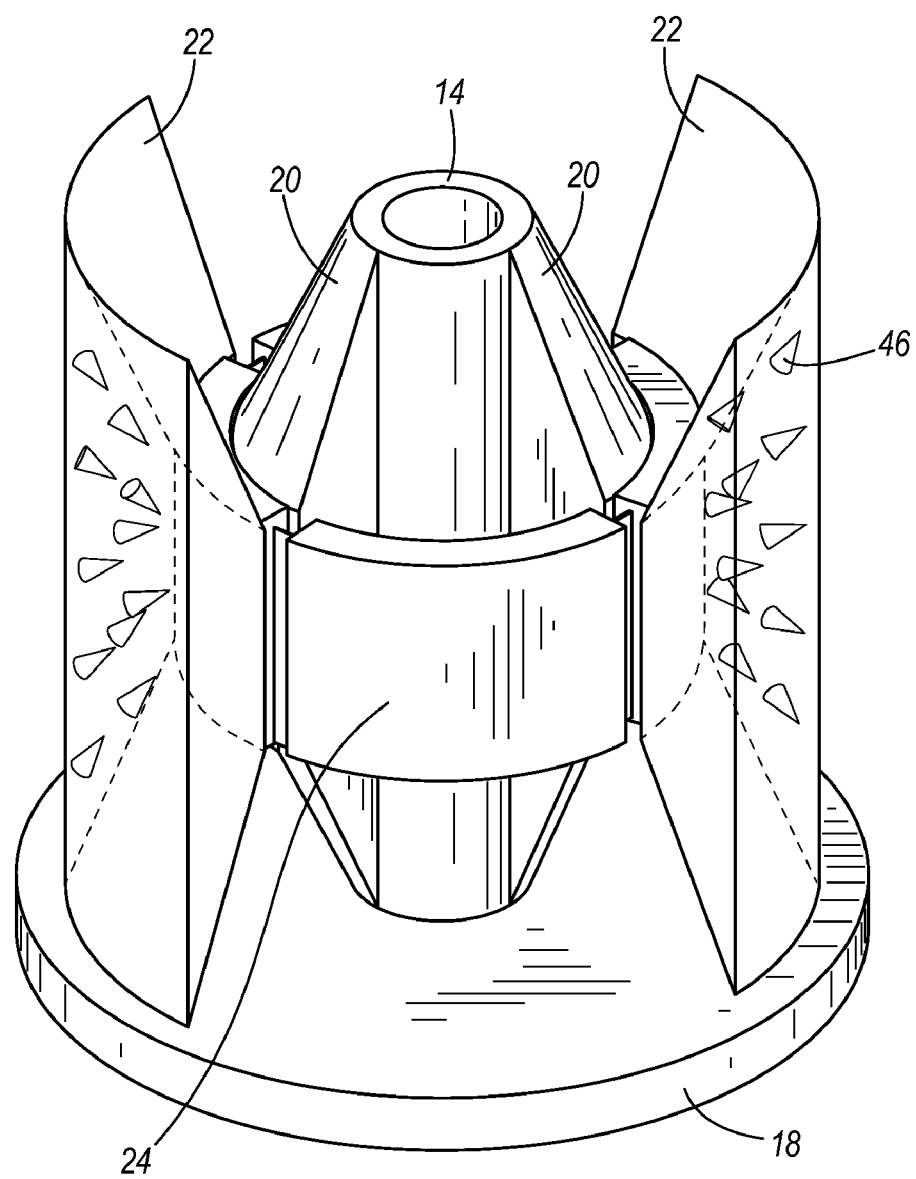
FIG. 20 is a perspective view of the magnetic refrigeration device of FIG. 2 showing magnetic field vectors.

FIG. 20, which illustrates the concept of congruent magnets, shows the flow direction of the magnetic field vectors 46 through the inner and outer permanent magnets 20, 22 in a view similar to that of FIG. 2. Each individual magnet 48 produces magnetic field vectors that travel parallel to each other. However, the permanent magnets 20, 22 as a whole are congruent magnets, which have a converging or diverging magnetic field that follows the convergent and divergent shape of the magnets as a whole. FIG. 20 shows that the magnetic field vectors 46 of the present invention are neither parallel nor do they travel in only one direction; rather, the magnetic field vectors 46 are shown in three dimensions to change direction continuously from one side of the magnet to the other. As a result, the strength of the magnetic field increases as the vectors 46 converge and become increasingly concentrated within the space.

The shape and construction of the magnets 20, 22 of the present invention, with the convergent portions being adjacent to the magnetocaloric elements 24, concentrates (and thus strengthens) the magnetic field 46 through the magnetocaloric elements 24 disposed between the magnets 20, 22. These vectors 46 are also shown in FIG. 21, which is a cross-sectional top view that cuts through the middle of the magnetic refrigeration device 10 at a height of about 125 mm from an inner surface of the end plate 18, along with the magnetic field strength measured in Tesla.

Figure 22:
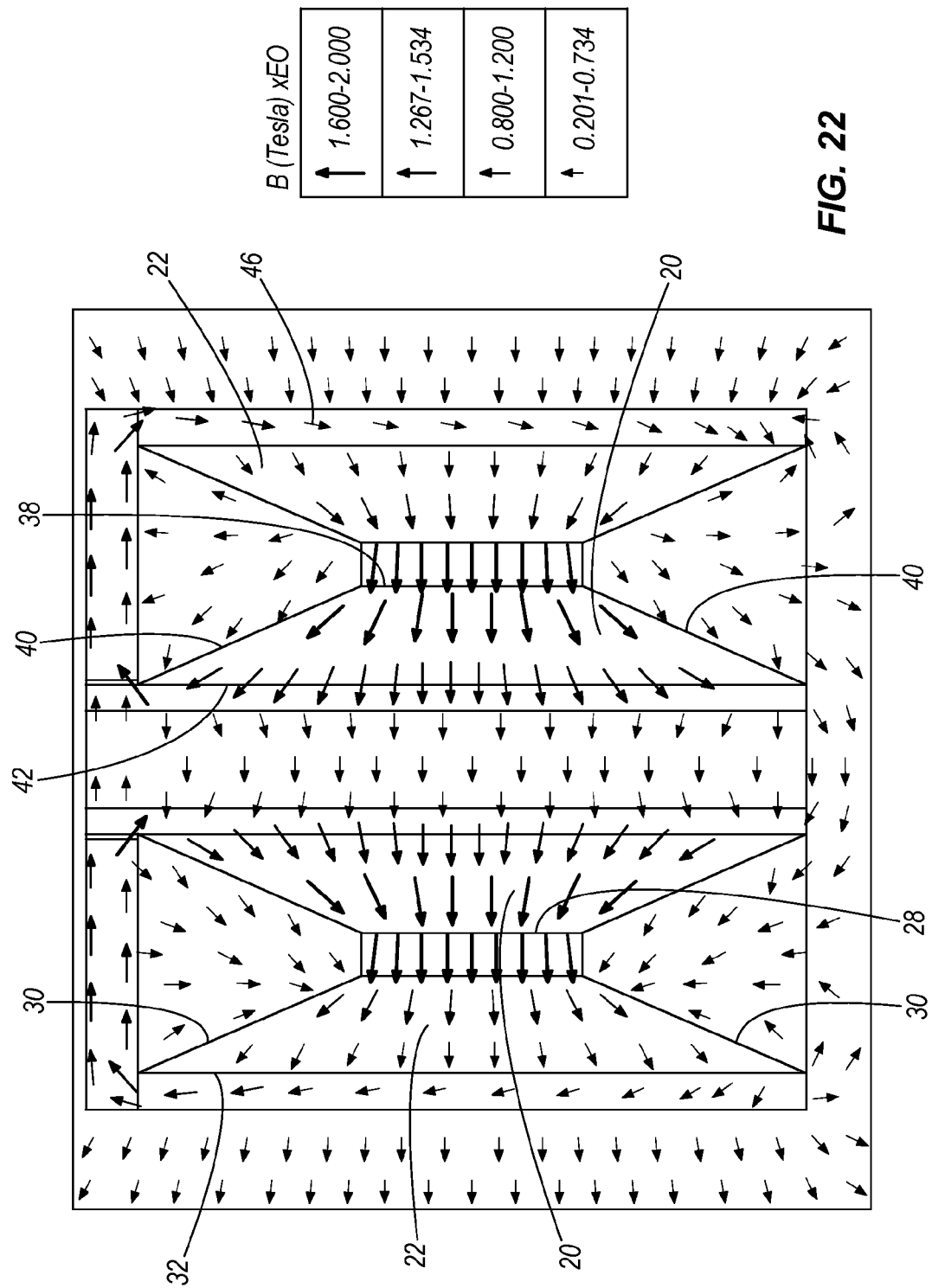
FIG. 22 is a cross-sectional side view of the magnetic refrigeration device shown in FIG. 1 including the magnetic field vectors.

As shown in FIGS. 21 and 22, the arrangement and construction of the inner and outer permanent magnets 20, 22 and the inner and outer yokes 14, 16 produces a significant magnetic field, as high as approximately 2 Tesla in parts of the outer yoke 16, parts of the inner permanent magnets 20 and parts of the magnetocaloric elements 24 or gaps adjacent to the inner permanent magnets 20.

The outer permanent magnet 22 converges from the outer surface 32 to its inner surface 26 by the radial side surfaces 34 and the tapered surfaces 30. The surface area of the outer surface 32 is greater than the surface area of the inner surface 26. Accordingly, the magnetic field density in the outer permanent magnet 22 also converges, or increases in density, from the larger outer surface 32 to the smaller inner surface 26 when the magnetic field lines run from the outer surface 32 to the inner surface 26. Conversely, when the magnetic field lines run from the inner surface 26 to the outer surface 32, the magnetic field density in the outer permanent magnet 22 diverges, or decreases in density, from the inner surface 26 to the outer surface 32. The direction of the field lines depends on which of the inner and outer surfaces 26, 32 is the north pole and which is the south pole.

The inner permanent magnet 20 converges in shape from the outer surface 36 to the inner surface 42 by the radial side surfaces 44, as viewed in FIG. 21. However, when viewed from a side cross section as in FIG. 22, the inner permanent magnet 20 diverges in shape from the outer surface 36 to the inner surface 42 by the tapered surfaces 40. The surface area of the inner surface 42 is greater than the surface area of the outer surface 36. Accordingly, the magnetic field density in the inner permanent magnet 20 diverges, or decreases in density, from the smaller outer surface 36 to the larger inner surface 42 when the magnetic field lines run from the outer surface 36 to the inner surface 42. Conversely, when the magnetic field lines run from the inner surface 42 to the outer surface 36, the magnetic field density in the inner permanent magnet 20 converges, or increases in density, from the inner surface 42 to the outer surface 36. The direction of the field lines depends on which of the inner and outer surfaces 36, 42 is the north pole and which is the south pole.

The respective side surfaces 34, 44 of the inner and outer permanent magnets 20, 22 are substantially aligned. The inner and outer surfaces 42, 26 of the inner and outer magnets 20, 22 are all concentrically positioned about the axis A. By way of this arrangement, the magnetic field passes through a first pair of inner and outer permanent magnets 20, 22 generally in a first direction toward the axis A, passes through the inner yoke 14 and axis A, and passes through the second opposite pair of inner and outer permanent magnets 20, 22 generally in the first direction, but away from the axis A. This general first direction of the magnetic field defines north and south poles relative to the entire magnetic assembly 12.

FIG. 22 shows a side cross-sectional view of the magnetic field vectors 46 passing through the magnetic refrigeration device 10. In this cross-sectional view, the inner and outer permanent magnets of each pair of permanent magnets are substantially mirror images of each other about an axis extending vertically through the center of the magnetocaloric element 24. However, the south pole and north pole of each permanent magnet 20, 22 alternates in the direction of the magnetic field vectors 46, and is therefore not symmetrical.

Figure 23:
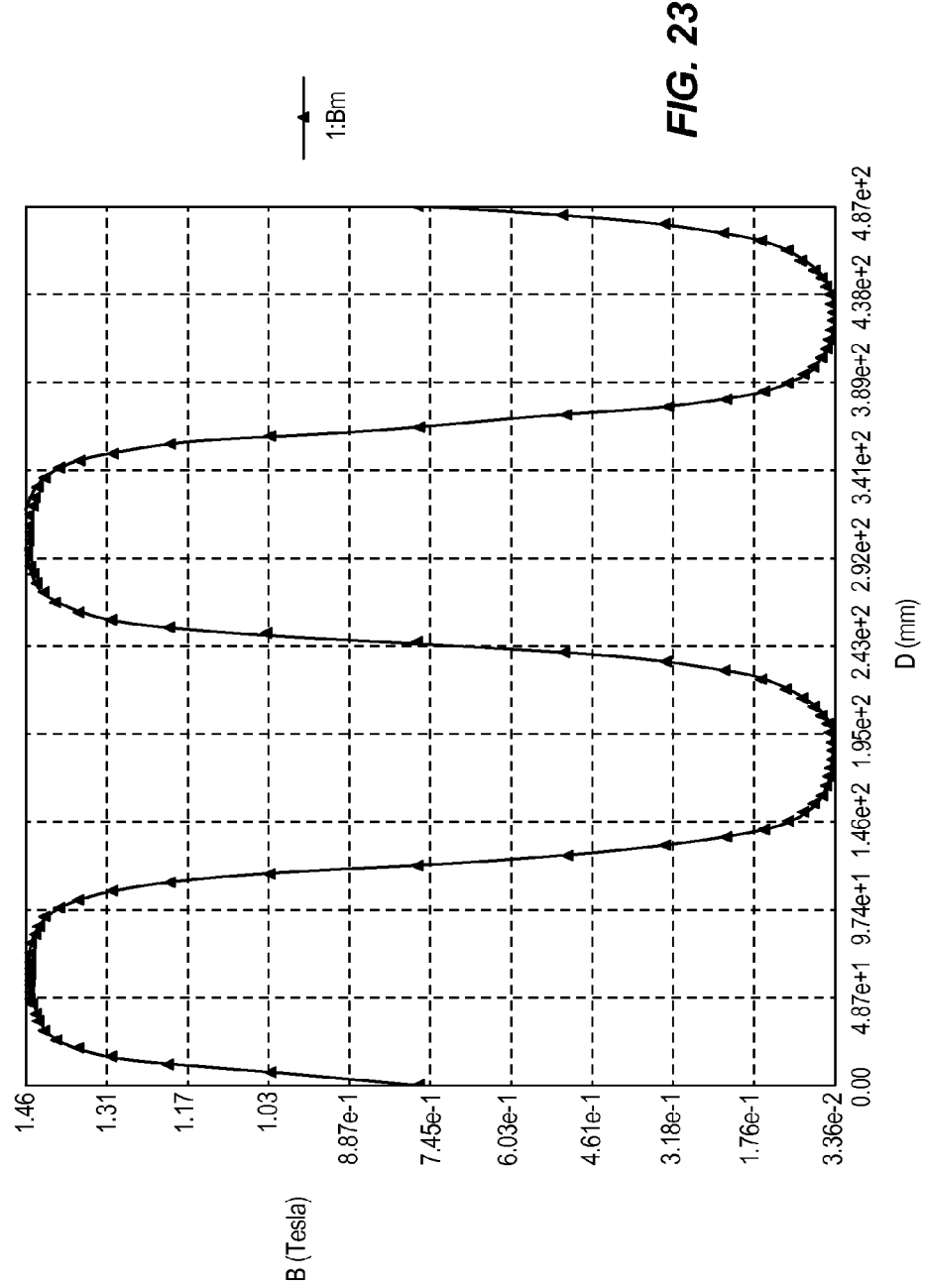
FIG. 23 is a plot of magnetic field strength as it varies over 360 degrees at a fixed radial distance from the center of the device.

Shown in FIG. 23 is a plot of magnetic field strength as it varies over 360 degrees at a fixed radial distance from the center axis A of the device 10, where this radial distance terminates in the middle of a magnetocaloric element 24 (or air gap), starting at one end of a magnetocaloric element 24 that is disposed between the inner and outer permanent magnets 20, 22, and moving first in a direction through the magnetocaloric element 24. The x-axis of the plot is the circumferential length of this radial distance in mm, but can also be interpreted as starting at 0 degrees (corresponding to 0 mm) and ending at 360 degrees (corresponding to 487 mm). The plot shows two peaks and two troughs, each being substantially flat. The peaks, approximately 1.46 Tesla, correspond to the magnetic field strength in the center of the magnetocaloric elements 24 that are disposed between the permanent magnets 20 and 22. The troughs, approximately zero Tesla, correspond to the magnetic field strength in the magnetocaloric elements 24 not disposed between the inner outer permanent magnets 20, 22. The flatness of the peaks and troughs is significant because it shows that this magnetic refrigeration device configuration allows a high magnetic field strength to be maintained throughout the circumferential length of the magnetocaloric elements 24 disposed between the permanent magnets 20, 22, and that a low magnetic field strength is maintained throughout the circumferential length of the magnetocaloric elements 4 not disposed between the permanent magnets 20, 22. This feature of the invention is particularly desirable in magnetic refrigeration devices because magnetocaloric materials change temperature with changing magnetic fields, so the more uniformly distributed the magnetic field is throughout the magnetocaloric element, the more efficient the magnetic refrigeration device will be.

Another feature of this invention that improves the efficiency of the magnetic refrigeration device 10 is the configuration of the outer yoke 16 and the material selected for it. Magnetically permeable materials provide a path through which the lines of a magnetic field easily follow. FIG. 21 confirms this by showing that as the magnetic field lines exit the north pole of the outer permanent magnet 22, the magnetic field lines then travel almost entirely through the outer yoke 16 (at a strength of approximately 2 Tesla) towards the south pole of the other outer permanent magnet 22. The magnetic field lines shown escaping the outer yoke 16 have a very low strength of approximately 0.2 Tesla or less. Therefore, there is very little magnetic leakage with this design, which makes it more efficient.

Advantages of the congruent magnet construction include the fact that less magnetic material is required to produce a stronger magnetic field, i.e., the ratio of total magnet volume to magnetic field workspace volume (for example, the volume of the two magnetocaloric elements 24 disposed between the magnets 20, 22) is lower than in previous designs—preferably a ratio of less than 25. It is also lower than a non-congruent magnet construction having the same overall shape, i.e., if the inner and outer magnets had parallel magnetic field lines and the same shape and dimensions as the congruent magnets 20, 22, the congruent magnet arrangement would have a lower ratio. This is another way of saying that less magnet material is needed to create a certain magnetic field strength in a workspace when the magnets are congruent magnets, as described by the present invention.

Figure 24:
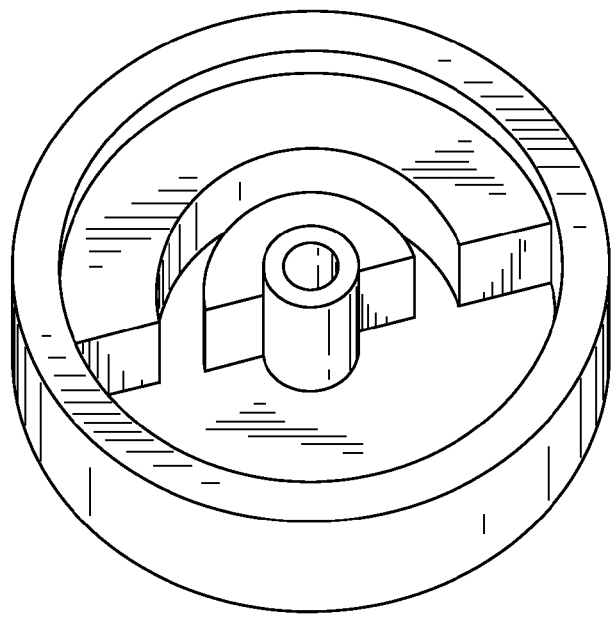
FIG. 24 is another construction of the magnetic refrigeration device including two permanent magnets.
Figure 25:
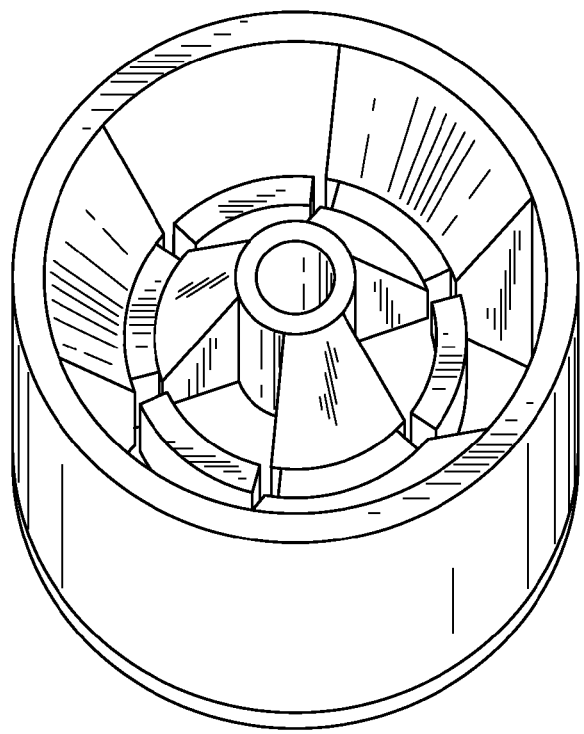
FIG. 25 is another construction of the magnetic refrigeration device including six permanent magnets.
Figure 26:
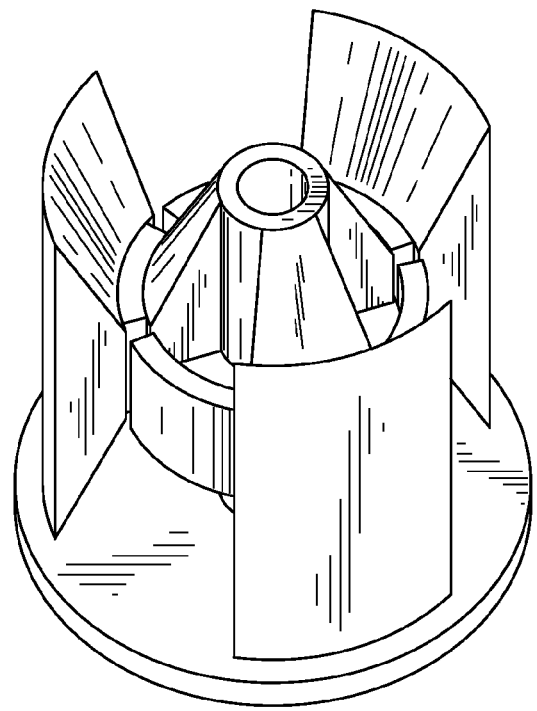
FIG. 26 is a perspective view of the magnetic refrigeration device shown in FIG. 25 with an outer yoke of the magnetic refrigeration device removed.
Figure 27:
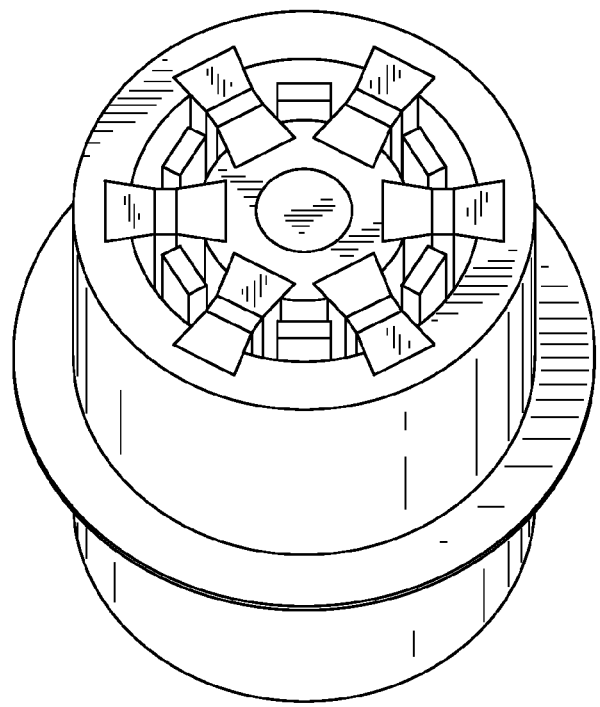
FIG. 27 is another construction of the magnetic refrigeration device including twelve permanent magnets.

Additionally, a magnetic refrigeration device having any even number of permanent magnets in a similar configuration could be used. For example, FIG. 24 shows a second construction of a magnetic refrigeration device having two permanent magnets (one inner and one outer). This second construction could be used with two magnetocaloric elements. FIG. 25 shows a third construction of a magnetic refrigeration device having six permanent magnets (three inner and three outer) and 6 magnetocaloric elements. FIG. 26 shows a second view of the third construction with the outer yoke hidden from view. FIG. 27 shows a fourth construction of a magnetic refrigeration device having 12 permanent magnets (six inner and six outer) and 12 magnetocaloric elements.

Furthermore, the permanent magnet configurations of the present invention need not be limited to applications in magnetic refrigeration. Such magnet configurations may also be used with data storage devices such as floppy disks, scan disks, and flash drives, for example, to erase data from these devices or manipulate the data in other ways.

What is claimed is:

1. A magnet arrangement for creating a magnetic field, comprising:
   a first magnet having a first surface defining a first pole and a second surface defining a second pole opposite the first pole, wherein the second surface has a higher magnetic flux density than the first surface;
   a second magnet having a third surface defining a third pole and a fourth surface defining a fourth pole opposite the third pole, wherein the third surface has a higher magnetic flux density than the fourth surface, wherein the second magnet is spaced from the first magnet to define a first gap between the second surface and the third surface, and wherein magnetic field lines of the magnetic field run from the first surface to the second surface, from the second surface to the third surface through the first gap, and from the third surface to the fourth surface;

a third magnet spaced from the second magnet and having a fifth surface defining a fifth pole and a sixth surface defining a sixth pole opposite the fifth pole, wherein the sixth surface has a higher magnetic flux density than the fifth surface, and wherein the magnetic field lines run from the fourth surface to the fifth surface and from the fifth surface to the sixth surface;

a fourth magnet spaced from the third magnet and having a seventh surface defining a seventh pole and an eighth surface defining an eighth pole opposite the seventh pole, wherein the seventh surface has a higher magnetic flux density than the eighth surface, wherein the fourth magnet is spaced from the third magnet to define a second gap between the sixth surface and the seventh surface, and wherein the magnetic field lines run from the sixth surface to the seventh surface through the second gap, and from the seventh surface to the eighth surface;

wherein the magnetic field converges through the first magnet, then passes through the first gap, then diverges through the second magnet, then converges through the third magnet, then passes through the second gap, then diverges through the fourth magnet and then returns from the fourth magnet to the first magnet.

2. The magnet arrangement of claim 1, wherein the magnetic flux density in the gap is larger than the magnetic flux density of the first surface.

3. The magnet arrangement of claim 1, wherein the magnetic flux density in the second gap is larger than the magnetic flux density of the eighth surface.

4. The magnet arrangement of claim 1, further comprising a first magnetically permeable element disposed between the second magnet and the third magnet to create a path for the magnetic field lines to run from the fourth surface to the fifth surface through the first magnetically permeable element.

5. The magnet arrangement of claim 4, further comprising a second magnetically permeable element disposed adjacent the first surface and the eighth surface to create a path for the magnetic field lines to run from the first surface to the eighth surface through the second magnetically permeable element.

6. The magnet arrangement of claim 5, wherein the first magnetically permeable element includes a cylindrical tube.

7. The magnet arrangement of claim 6, wherein the second magnetically permeable element includes a cylindrical tube that is larger in diameter than the first magnetically permeable element.

8. The magnet arrangement of claim 1, wherein the second surface has less surface area than the first surface.

9. The magnet arrangement of claim 1, further comprising a magnetocaloric material disposed in the first gap.

10. The magnet arrangement of claim 1, wherein the first magnet is formed of a plurality of magnet segments, wherein at least one of the magnet segments includes a portion of the first surface and a portion of the second surface, wherein each of the magnet segments includes parallel magnetic field lines, and wherein the first magnet includes non-parallel magnetic field lines.

11. The magnet arrangement of claim 1, wherein the second surface is arcuate and the third surface is arcuate, and wherein the second surface and the third surface share a common arc center.

12. A magnet arrangement, comprising: a first magnet having a first generally arc-shaped cross section; a second magnet spaced from the first magnet to define a first gap between the first magnet and the second magnet, the second magnet having a second generally arc-shaped cross section; a third magnet having a third generally arc-shaped cross section; and a fourth magnet spaced from the third magnet to define a second gap between the third magnet and the fourth magnet, the fourth magnet having a fourth generally arc-shaped cross section; wherein the first and second generally arc-shaped cross sections share a common arc center; wherein the first magnet and the second magnet create a magnetic field including magnetic field lines that converge in the first magnet, run through the first gap between the first and second magnets, and diverge in the second magnet; wherein the first gap is remote from the arc center; wherein the third magnet and the fourth magnet contribute to the magnetic field including magnetic field lines that run from the second magnet to the third magnet, converge in the third magnet, run through the second gap, and diverge in the fourth magnet; and wherein the second gap is remote from the arc center and wherein the arc center is substantially between the first gap and the second gap.

13. The magnet arrangement of claim 12, further comprising magnetocaloric material disposed in the first gap and in the second gap.

14. The magnet arrangement of claim 12, further comprising magnetocaloric material disposed in the first gap.

15. The magnet arrangement of claim 14, wherein the surface areas of the poles of the first magnet decrease in the direction of the magnetic field lines and the surface areas of the poles of the second magnet increase in the direction of the magnetic field lines.

* * * * *